US007231700B2

(12) United States Patent
Hubbard

(10) Patent No.: US 7,231,700 B2
(45) Date of Patent: Jun. 19, 2007

(54) HAND TOOL FOR REMOVING PUSH NUTS

(76) Inventor: Noah R. Hubbard, 5558 W. 800 North, Michigan City, IN (US) 46360

( * ) Notice: Subject to any disclaimer, the term of this patent is extended or adjusted under 35 U.S.C. 154(b) by 66 days.

(21) Appl. No.: 11/118,723

(22) Filed: Apr. 28, 2005

(65) Prior Publication Data

US 2006/0242811 A1 Nov. 2, 2006

(51) Int. Cl.
*B23P 19/04* (2006.01)

(52) U.S. Cl. ........................................................ 29/267

(58) Field of Classification Search .................. 29/267; 254/25, 28; 294/19.3, 19.2, 26

See application file for complete search history.

(56) References Cited

U.S. PATENT DOCUMENTS 1,043,369 A * 11/1912 Smith .......................... 254/25

OTHER PUBLICATIONS

U.S. Appl. No. 10/822,119, Hubbard, Noah R.

* cited by examiner

*Primary Examiner*—Robert C. Watson
(74) *Attorney, Agent, or Firm*—R. Tracy Crump

(57) ABSTRACT

The hand tool embodying this invention allows push nuts to be quickly and easily removed from axle rods and other shafts. The tool has a specialized head welded to a long handle. The tool head includes an end socket head and an extractor. The socket head has an open throat within which the caps of push nuts are seated. The sides of the socket head are cut down to form two axial cusps on either side of the socket head. The extractor is welded to the socket head and terminates in a flat claw, which extends downward in front and angles slightly toward the open mouth of the socket head.

7 Claims, 6 Drawing Sheets

HAND TOOL FOR REMOVING PUSH NUTS

This invention relates to a hand tool for removing push nuts from axle rods.

BACKGROUND OF INVENTION

Push nuts are convenient fasteners for a variety of applications. Push nuts are often used to secure wheels to axle rods in the simple wheel assemblies on such products, as rollout carts, garden carts, children's riding toys and tricycles. While a convenient and inexpensive fastener, push nuts are also difficult to remove once pressed onto the end of an axle shaft. The teeth formed in the capped head of the push nut allow the nut to be pressed linearly onto the axle, but prevent the nut from sliding back off the axle. Consequently, push nuts must be pried, cut or ground off the cart axle shaft. Often the easiest method for removing push nuts is to grind them off the axle shaft.

SUMMARY OF INVENTION

The hand tool embodying this invention allows push nuts to be quickly and easily removed from axle rods and other shafts. The tool includes a long handle, a tubular socket head and an extractor. The socket head is axially mounted to the handle and has an open throat within which the caps of push nuts are seated. The side walls of the socket head are cut down to form two axial cusps on either side of the socket head. The extractor is welded to the side wall of the socket head and terminates in a flat claw, which extends downward in front and angle slightly toward the open mouth of the socket head.

A push nut is removed from an axle or shaft by seating the tool on the push nut so that the extractor claw abuts against the back of the push nut flange and the cusps of the socket head abut the front of the push nut flange over the push nut teeth. Light downward pressure is applied to the handle of the tool and deforms the push nut flange bending the flange at the contact point between the cusps and the flange, which pulls the teeth from engagement with the shaft.

Accordingly, the tool embodying this invention allows push nuts to be removed from axles, shafts and other rods and pins in seconds with little manual force. The extractor and socket head design of the tool head ensures that the push nut flange deforms to disengage the teeth so that the push nut can be easily pulled from a shaft. The tool is light weight and can be grasped and operated with a single hand.

These and other advantages of the present invention will become apparent from the following description of an embodiment of the invention with reference to the accompanying drawings.

BRIEF DESCRIPTION OF THE DRAWINGS

The preferred embodiments of the invention have been depicted for illustrative purposes only wherein.

DESCRIPTION OF THE PREFERRED EMBODIMENT

Figure 1:
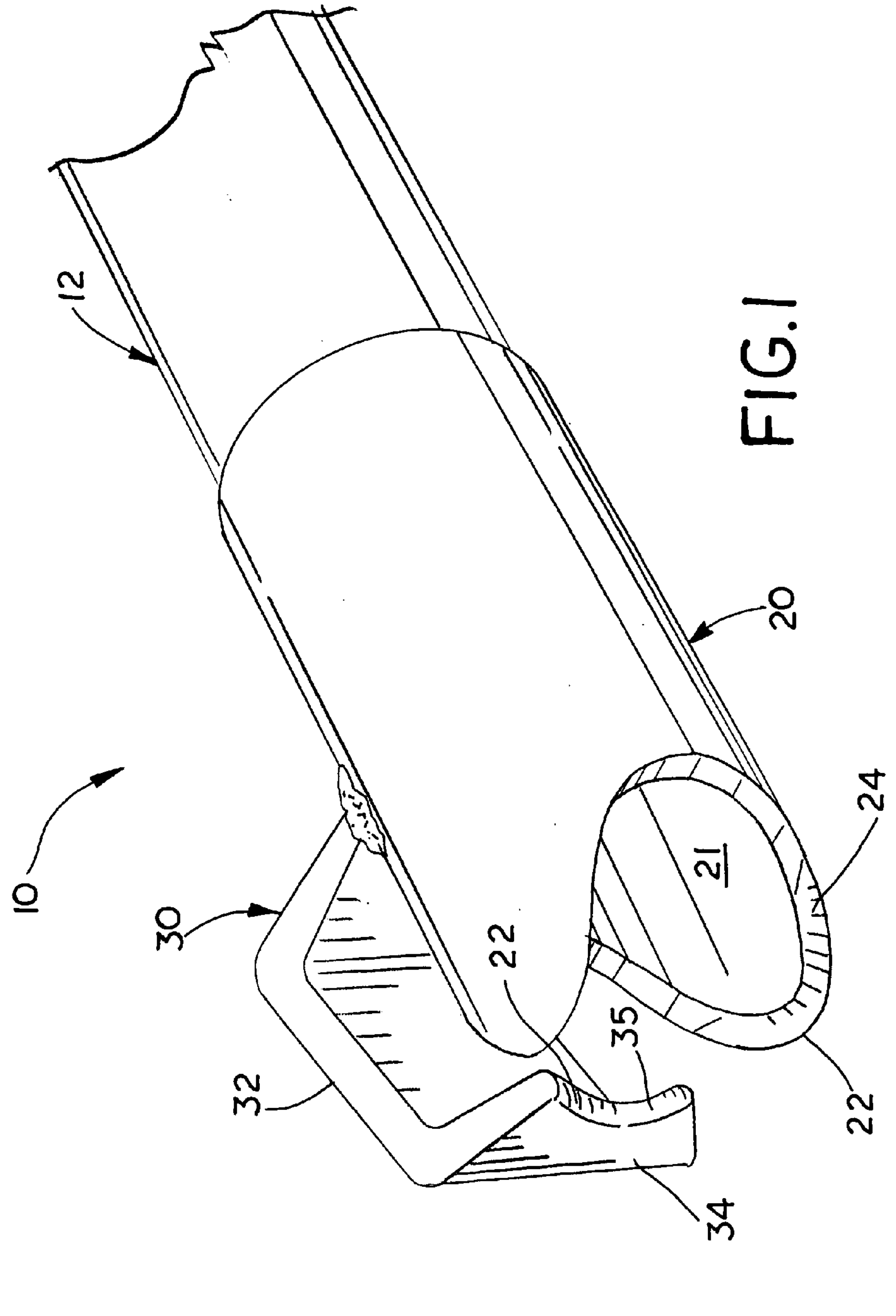
FIG. 1 is a partial perspective view of an embodiment of the hand tool of this invention.
Figure 2:
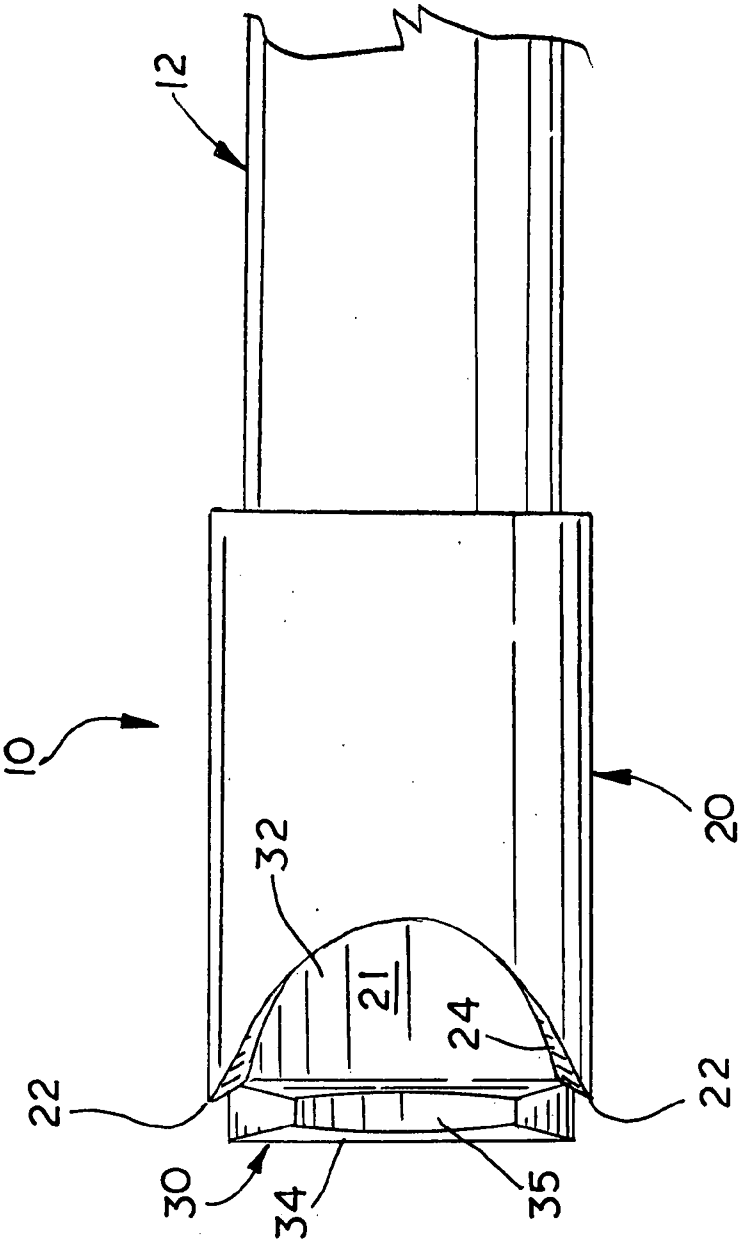
FIG. 2 is a partial bottom view of the embodiment the hand tool of FIG. 1.
Figure 3:
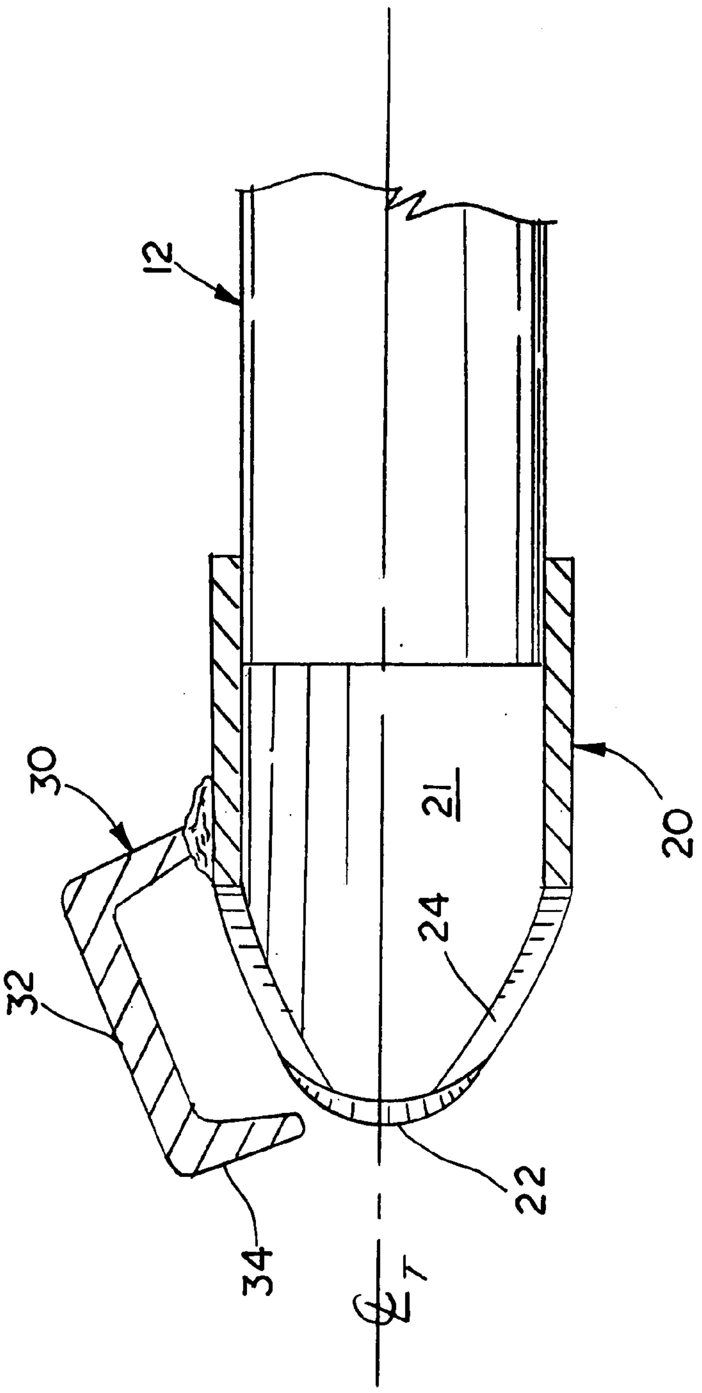
FIG. 3 is a side sectional view of the embodiment of the hand tool of FIG. 1.

Referring now to the drawings, the hand tool designated generally as reference numeral 10 is an embodiment of this invention. As shown, tool 10 includes a long handle 12, a socket head 20 and an extractor 30. A grip 14 is secured to the opposite end of handle 12 to assist a user in grasping tool 10. Socket head 20 is formed by a length of tubular steel and has an open throat 21 within which the cap of a push nut is seated. The inner diameter of socket head 20 is dimensioned to received the cap of a specific size of push nut; consequently, the tool is intended to be sized with socket heads of various diameters to accommodate the different sizes of push nuts. As shown, socket head 20 is welded axially to one end of handle 12. The side walls of socket head 20 are cut down to form two axial cusps 22 on either side of the socket head. Cusps 22 are symmetrical and the apex of both cusps aligns with the longitudinal axis ($CL_T$) of the handle. Cusps 22 have an inwardly beveled edge 24. Extractor 30 is a flat rigid piece of metal, bent in a U-shape and welded to the socket head 20. Extractor 30 has a back 32, which is inclined to the longitudinal axis of socket head 20 and handle 14. Extractor 30 terminates in a flat claw 34, which extends downward in front and angles slightly toward the open mouth of socket head 20. Extractor claw 34 has a concave bottom edge 35.

Tool 10 is designed to manually remove conventional push nuts from shafts, axles, pins and other metal cylindrical rods and parts. Push nuts are well known in the art and exist in many styles, configurations, sizes and types. Push nuts, particularly pal nuts are typically stamped metal pieces, but may be formed of plastic or other materials. A typical push nut is illustrated in the drawings and designated generally, as reference numeral 50. Push nut 50 has a cylindrical head or cap 52 and an annular flange 54. Push nut 50 also has a pair of teeth 56, which is stamped or cut where the flange curves in cap 52. Teeth 56 are stamped or cut into the material of the nut where the flange 54 curves into cap 52 so that the teeth protrude inward at a slight angle. Teeth 56 protrude inward to engage the axle or shaft, which holds and secures the push nut to the shaft.

Figure 4:
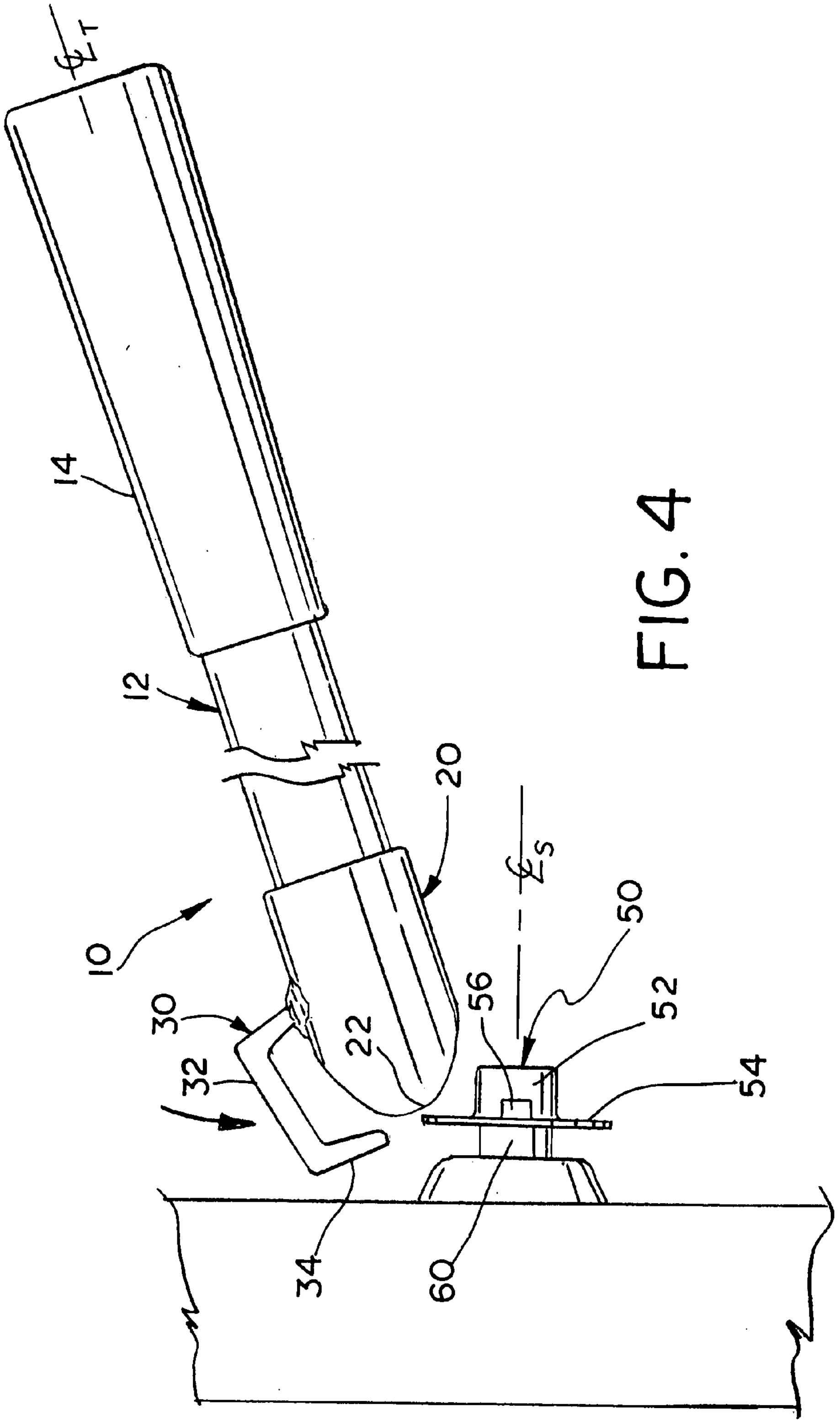
FIGS. 4–6 are a side view of the hand tool of FIG. 1 and a simple wheel assembly illustrating how the hand tool is used to remove a push nut from a shaft.
Figure 5:
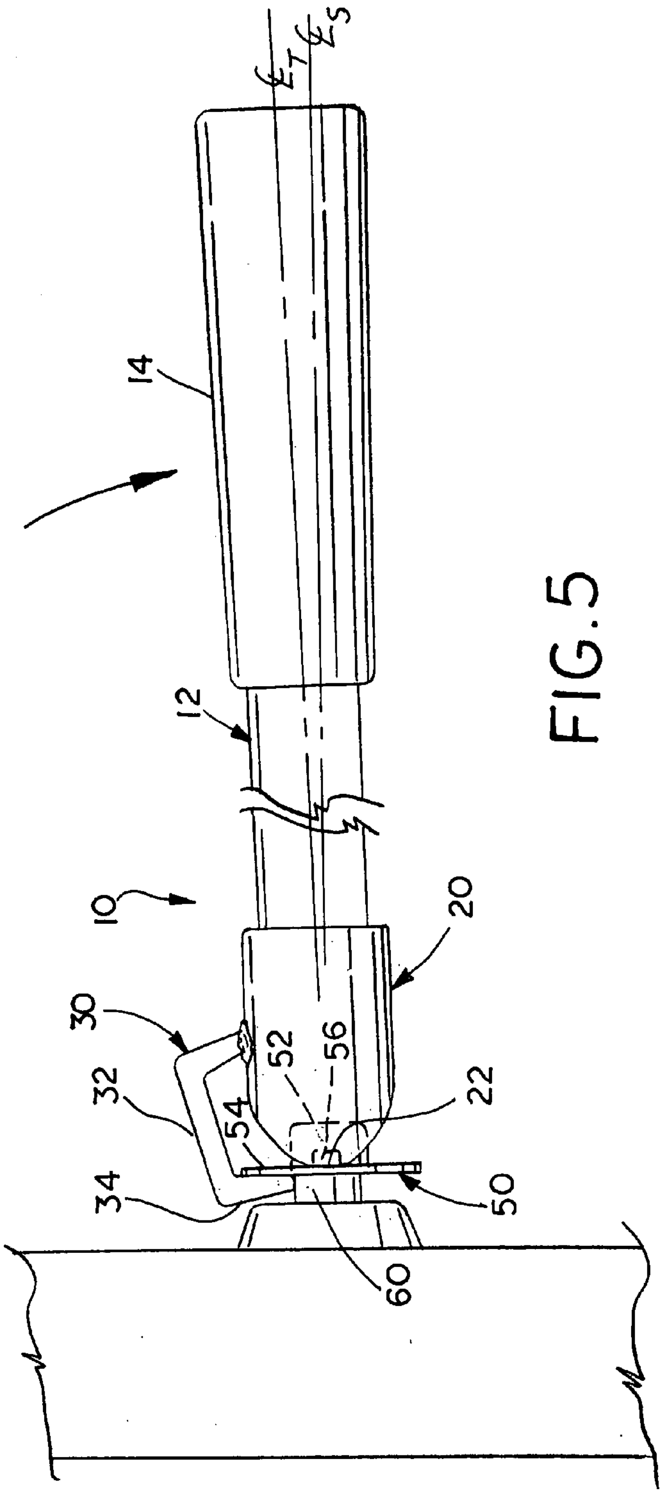
Figure 6:
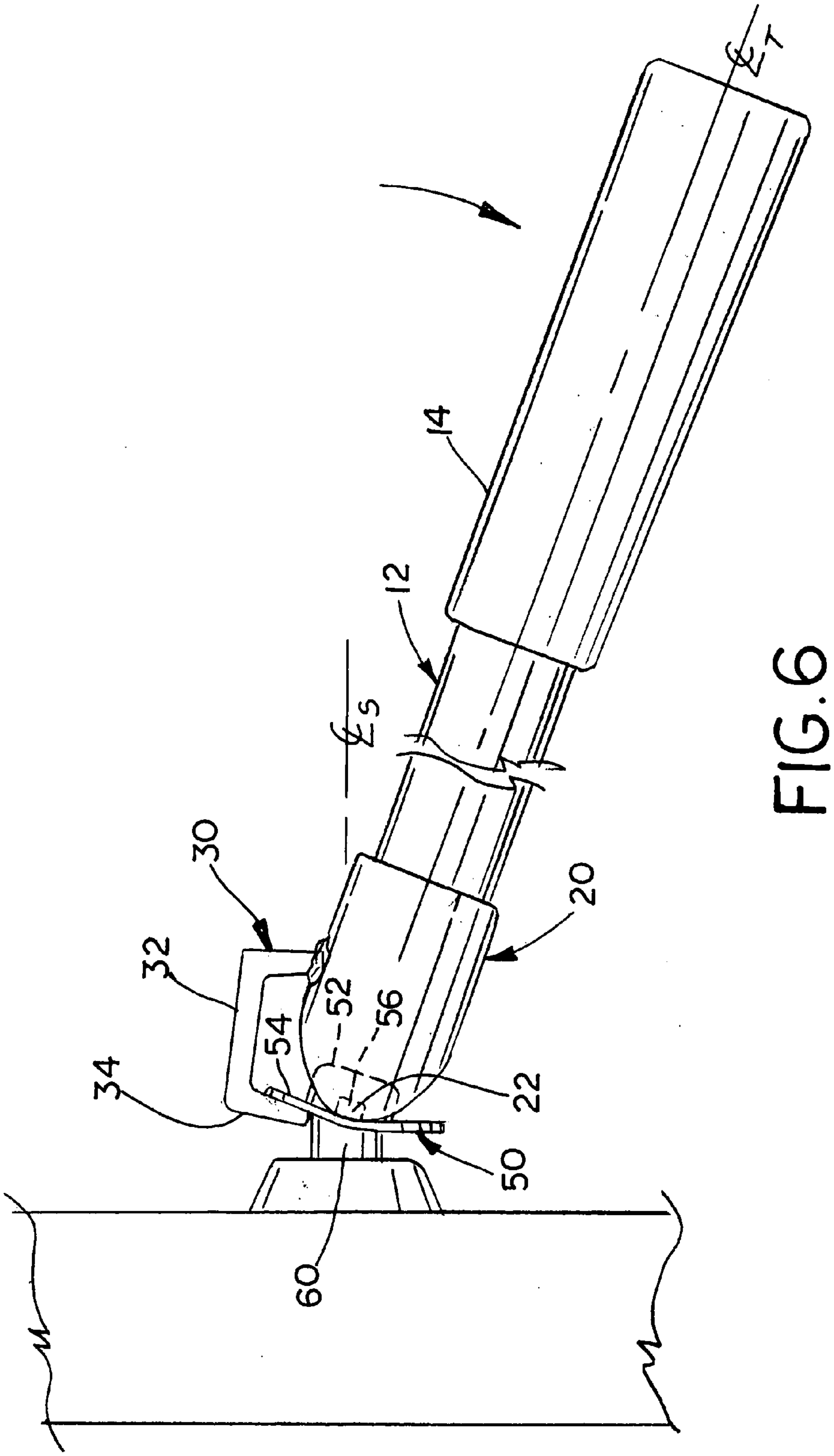

FIGS. 4–6 illustrate how tool 10 is used to remove a push nut 50 from a cylindrical axle rod or shaft 60 in a simple wheel assembly. Although the operation of the tool is illustrated in the drawings and described herein removing a push nut from a wheel assembly, the teachings of this invention are applicable to the removal of push nuts from any axle, shaft or pin in any application.

FIG. 4 shows the initial position of tool 10 for seating the tool onto the push nut, which is to be removed. The user holds tool 10 at the grip and manipulates the tool in the same fashion as other manual hand tools. Tool 10 is positioned in the vertical plane of the longitudinal axis ($CL_S$) of shaft 60. As shown, tool 10 is positioned with the vertical plane at an angle to the longitudinal axis ($CL_S$) of shaft 60 (approximately twenty degrees). As shown in FIG. 4, positioning tool 10 at an angle allows push nut flange 54 to slide between cusps 22 and extractor claw 34 when tool 10 is lowered onto the push nut as the tool is seated onto the push nut. It should be noted that tool 10 and push nut 50 are oriented so that cusps 22 overlie the teeth 56 of push nut 50 when the tool properly engages the push nuts. Typically, this orientation is accomplished simply by positioning push nut 50 so that teeth 56 are positioned horizontal as shown in FIG. 4, or by simply positioning tool 10 so that cusp 22 overlie teeth 56.

FIG. 5 shows tool 10 seated on push nut 50 to begin applying force to push nut flange 54. Once tool 10 is seated on push nut 50, extractor claw 34 abuts against the back of push nut flange 54 with cusps 22 abutting the front of push nut flange 54 over teeth 56. In this position, tool 20 can support itself on the push nut. It should be noted that bottom edge 36 of extractor claw 34 conforms to the diameter of shaft 60 so that the extractor claw seats atop the shaft and extends partially around the shaft to abut against more area of the push nut flange 54.

To remove push nut 50 from shaft 60, a light downward press is applied to handle 14 rotating tool 10 downward within the vertical plane of the longitudinal axis ($CL_S$) of shaft 60. The downward rotation of tool 10 deforms push nut flange 54 bending the flange at the contact point between cusps 22 and the flange, which pulls teeth 56 from engagement with shaft 60. Once teeth 56 disengage shaft 60, tool 10 pulls push nut 50 from shaft 60. As shown in FIG. 5, when handle 12 rotates so that the longitudinal axis ($CL_T$) of handle 12 substantially aligns with the longitudinal axial ($CL_S$) of shaft 60, extractor claw 34 begins to deforming push nut flange 54. FIG. 6 shows tool 10 freely pulling push nut 50 from shaft 60, where teeth 56 can been complete disengaged from shaft 60.

ADVANTAGES

One skilled in the art will note several advantages provided by the hand tool embodying this invention. The tool allows push nuts to be removed from axles, shafts and other rods and pins in seconds with little manual force. The extractor and socket head design of the tool head ensures that the push nut flange deforms to disengage the teeth so that the push nut can be easily pulled from a shaft. Because the head of the push nut is seated within the socket head, the tool ensures a positive engagement with the push nut. The apex and beveled edge of the cusps provides a positive contact point about which the push nut flange is bent. The socket head can be dimensioned to accommodate any push nut size. The tool is light weight and can be grasped and operated with a single hand. The tool has a sturdy durable construction, which is simple to manufacture.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A hand tool for removing push nuts from the end of a cylindrical shaft, where the push nut includes a cap for receiving the end of the axle rod, an annular flange extended around the cap and a tooth formed between the cap and the flange that restrictively engages the shaft end when pressed onto the shaft end, the tool comprising:

an elongated handle;

a socket head extending longitudinally from one end of the handle and having a tubular side wall defining an open mouth for receiving the cap of the push nut, the side walls extending longitudinally to form a cusp such that the cusp overlies the push nut tooth when the push nut cap is seated within the socket head mouth; and an extractor extending from the socket head side wall and terminating in a flat claw suspended between and spaced in front of the socket head cusp, such that the push nut flange is restrictively interposed between the extractor claw and the socket head cusp when the push nut cap is seated within the socket head mouth, the socket head cusp and extractor claw constitute means for deforming the push nut flange to disengage the push nut tooth from the shaft when the handle is rotated relative to the shaft, whereby the extractor claw forceably abuts the push nut flange to bend the push nut flange adjacent the push nut tooth about the socket head cusp.

2. The tool of claim 1 wherein the socket head side wall includes a second cusp.

3. The tool of claim 1 wherein the extractor claw is suspended at an angle relative to the longitudinal axis of the socket head so that the handle is angled relative to the shaft when the push nut cap is seated within the socket head mouth.

4. The tool of claim 1 wherein the extractor claw has a concave bottom edge for receiving the shaft when the push nut cap is seated within the socket head mouth.

5. A hand tool for removing push nuts from the end of a cylindrical shaft, where the push nut includes a cap for receiving the end of the axle rod, an annular flange extended around the cap and a tooth formed between the cap and the flange that restrictively engages the shaft end when pressed onto the shaft end, the tool comprising:

an elongated handle;

a socket head extending longitudinally from one end of the handle and having a tubular side wall defining an open mouth for receiving the cap of the push nut, the side walls extending longitudinally to form a cusp such that the cusp overlies the push nut tooth when the push nut cap is seated within the socket head mouth; and an extractor extending from the socket head side wall and terminating in a flat claw suspended between the socket head cusp and spaced in front of the socket head mouth of the socket head, such that the push nut flange is restrictively interposed between the extractor claw and the socket head cusp when the push nut cap is seated within the socket head mouth, the extractor claw has a concave bottom edge for receiving the shaft when the push nut cap is seated within the socket head mouth, the socket head cusp and extractor claw constitute means for deforming the push nut flange to disengage the push nut tooth from the shaft when the handle is rotated relative to the shaft, whereby the extractor claw forceably abuts the push nut flange to bend the push nut flange adjacent the push nut tooth about the socket head cusp.

6. The tool of claim 5 wherein the socket head side wall includes a second cusp.

7. The tool of claim 5 wherein the extractor claw is suspended at an angle relative to the longitudinal axis of the socket head so that the handle is angled relative to the shaft when the push nut cap is seated within the socket head mouth.

* * * * *